United States Patent
Sharp

(10) Patent No.: US 11,703,623 B2
(45) Date of Patent: *Jul. 18, 2023

(54) WIDE-ANGLE COMPENSATION OF UNIAXIAL RETARDER STACKS

(71) Applicant: META PLATFORMS TECHNOLOGIES, LLC, Menlo Park, CA (US)

(72) Inventor: Gary D. Sharp, Boulder, CO (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,342

(22) Filed: Mar. 12, 2022

(65) Prior Publication Data

US 2022/0196899 A1  Jun. 23, 2022

Related U.S. Application Data

(63) Continuation of application No. 16/037,934, filed on Jul. 17, 2018, now Pat. No. 11,294,113.

(Continued)

(51) Int. Cl.
*G02B 5/30* (2006.01)
*G02F 1/13363* (2006.01)

(52) U.S. Cl.
CPC ........ *G02B 5/3083* (2013.01); *G02F 1/13363* (2013.01); *G02F 2413/03* (2013.01); *G02F 2413/08* (2013.01); *G02F 2413/14* (2013.01)

(58) Field of Classification Search
None
See application file for complete search history.

(56) References Cited

U.S. PATENT DOCUMENTS

| | | |
|---|---|---|
| 2,607,272 A | 8/1952 | Bond |
| 4,511,225 A | 4/1985 | Lipson |
| (Continued) | | |

FOREIGN PATENT DOCUMENTS

| | | |
|---|---|---|
| JP | H11504441 A | 4/1999 |
| JP | 2008152219 A | 7/2008 |
| (Continued) | | |

OTHER PUBLICATIONS

Office Action dated Jun. 7, 2022 for Japanese Patent Application No. 2020502237, filed on Jul. 17, 2018, 13 pages.

(Continued)

*Primary Examiner* — Derek S. Chapel
(74) *Attorney, Agent, or Firm* — Greenberg Traurig, LLP

(57) ABSTRACT

A compound retarder that creates independent control of $R_e$ and $R_{th}$. This can be done by forming a three-layer compound retarder, including a pair of matched −A-plates, combined with single +A-plate. The +A-plate is typically an MD-stretched film, with retardation that is specific to the in-plane requirements ($R_e$) of the application. The pair of −A-plates have their optic axes crossed, such that $R_e=0$, with an optic axis aligned parallel to the +A-plate. A single retardation value for the −A-plate can produce improved field-of-view performance over a broad range of $R_e$ values, making it a very practical means of universal compensation. While $R_{th}$ is typically associated with a single retarder, retarder stacks with a diverse range of optic-axis orientations can be considered to have a compound (or composite) $R_{th}$ value ($R_{th}^c$). The three-layer compound retarder has the practical benefit of enabling field-of-view compensation across a broad range of normal-incidence polarization transformations.

18 Claims, 8 Drawing Sheets

Related U.S. Application Data

(60) Provisional application No. 62/533,547, filed on Jul. 17, 2017.

(56) References Cited

U.S. PATENT DOCUMENTS

| | | |
|---|---|---|
| 4,884,876 A | 12/1989 | Lipton et al. |
| 5,132,826 A | 7/1992 | Johnson et al. |
| 5,231,521 A | 7/1993 | Johnson et al. |
| 5,243,455 A | 9/1993 | Johnson et al. |
| 5,381,253 A | 1/1995 | Sharp et al. |
| 5,387,958 A | 2/1995 | Pashley |
| 5,493,426 A | 2/1996 | Johnson et al. |
| 5,528,393 A | 6/1996 | Sharp et al. |
| 5,552,912 A | 9/1996 | Sharp et al. |
| 5,574,553 A | 11/1996 | McManamon et al. |
| 5,619,355 A | 4/1997 | Sharp et al. |
| 5,627,666 A | 5/1997 | Sharp et al. |
| 5,658,490 A | 8/1997 | Sharp et al. |
| 5,689,317 A | 11/1997 | Miller |
| 5,715,023 A | 2/1998 | Hoppe |
| 5,751,384 A | 5/1998 | Sharp |
| 5,781,268 A | 7/1998 | Liu et al. |
| 5,822,021 A | 10/1998 | Johnson et al. |
| 5,870,159 A | 2/1999 | Sharp |
| 5,892,559 A | 4/1999 | Sharp |
| 5,892,612 A | 4/1999 | Miller et al. |
| 5,929,946 A | 7/1999 | Sharp et al. |
| 5,953,083 A | 9/1999 | Sharp |
| 5,990,996 A | 11/1999 | Sharp |
| 5,999,240 A | 12/1999 | Sharp et al. |
| 6,028,656 A | 2/2000 | Buhrer et al. |
| 6,046,786 A | 4/2000 | Sharp et al. |
| 6,049,367 A | 4/2000 | Sharp et al. |
| 6,075,651 A | 6/2000 | Hoppe |
| 6,078,374 A | 6/2000 | Sharp et al. |
| 6,091,462 A | 7/2000 | Sharp et al. |
| 6,097,461 A | 8/2000 | Sharp |
| 6,141,069 A | 10/2000 | Sharp et al. |
| 6,141,071 A | 10/2000 | Sharp |
| 6,172,722 B1 | 1/2001 | Sharp |
| 6,183,091 B1 | 2/2001 | Johnson et al. |
| 6,252,638 B1 | 6/2001 | Johnson et al. |
| 6,273,571 B1 | 8/2001 | Sharp et al. |
| 6,310,673 B1 | 10/2001 | Sharp |
| 6,380,997 B1 | 4/2002 | Sharp et al. |
| 6,417,892 B1 | 7/2002 | Sharp et al. |
| 6,452,646 B1 | 9/2002 | Sharp et al. |
| 6,638,583 B1 | 10/2003 | Sharp et al. |
| 6,650,377 B2 | 11/2003 | Robinson et al. |
| 6,667,784 B2 | 12/2003 | Sharp et al. |
| 6,704,065 B1 | 3/2004 | Sharp et al. |
| 6,707,516 B1 | 3/2004 | Johnson et al. |
| 6,735,017 B1 | 5/2004 | Acosta et al. |
| 6,816,309 B2 | 11/2004 | Chen et al. |
| 6,882,384 B1 | 4/2005 | Sharp |
| 6,899,430 B2 | 5/2005 | Johnson et al. |
| 6,903,789 B1 | 6/2005 | Cutler et al. |
| 6,922,221 B2 | 7/2005 | Zhu et al. |
| 6,961,179 B2 | 11/2005 | Chen et al. |
| 6,961,181 B2 | 11/2005 | Chen et al. |
| 7,002,752 B2 | 2/2006 | Chen et al. |
| 7,083,282 B1 | 8/2006 | Sharp et al. |
| 7,106,509 B2 | 9/2006 | Sharp |
| 7,126,649 B2 | 10/2006 | Chen et al. |
| 7,154,667 B2 | 12/2006 | Birge et al. |
| 7,195,356 B1 | 3/2007 | Sharp |
| 7,298,386 B1 | 11/2007 | Sharp et al. |
| 7,345,723 B2 | 3/2008 | Robinson et al. |
| 7,436,476 B2 | 10/2008 | Sharp et al. |
| 7,510,280 B2 | 3/2009 | Sharp |
| 7,511,787 B2 | 3/2009 | Sharp |
| 7,528,906 B2 | 5/2009 | Robinson et al. |
| 7,545,469 B2 | 6/2009 | Robinson et al. |
| 7,583,439 B2 | 9/2009 | Tsai et al. |
| 7,692,746 B2 | 4/2010 | Sharp |
| 7,898,603 B2 | 3/2011 | Sharp |
| 7,898,734 B2 | 3/2011 | Coleman et al. |
| 7,905,602 B2 | 3/2011 | Schuck et al. |
| 8,004,758 B2 | 8/2011 | Coleman et al. |
| 8,072,681 B2 | 12/2011 | Coleman et al. |
| 8,085,644 B2 | 12/2011 | Sharp |
| 8,169,699 B2 | 5/2012 | Petersen et al. |
| 8,184,215 B2 | 5/2012 | Osterman et al. |
| 8,194,315 B2 | 6/2012 | Sharp et al. |
| 8,220,934 B2 | 7/2012 | Schuck et al. |
| 8,233,034 B2 | 7/2012 | Sharp et al. |
| 8,328,362 B2 | 12/2012 | Coleman et al. |
| 8,330,911 B2 | 12/2012 | Hong et al. |
| 8,403,488 B2 | 3/2013 | Schuck et al. |
| 8,408,708 B2 | 4/2013 | Sharp |
| 8,425,041 B2 | 4/2013 | Schuck et al. |
| 8,427,394 B2 | 4/2013 | Sharp et al. |
| 8,488,240 B2 | 7/2013 | Petersen et al. |
| 8,526,106 B2 | 9/2013 | Coleman et al. |
| 8,540,372 B2 | 9/2013 | Coleman et al. |
| 8,630,037 B1 | 1/2014 | Osterman et al. |
| 8,638,400 B2 | 1/2014 | Sharp et al. |
| 8,659,828 B2 | 2/2014 | Sharp et al. |
| 8,687,275 B2 | 4/2014 | Coleman et al. |
| 8,711,477 B2 | 4/2014 | Coleman et al. |
| 8,724,218 B2 | 5/2014 | Curtis et al. |
| 8,727,536 B2 | 5/2014 | Schuck et al. |
| 8,746,876 B2 | 6/2014 | Sharp et al. |
| 8,757,806 B2 | 6/2014 | Schuck et al. |
| 8,760,760 B2 | 6/2014 | Coleman et al. |
| 8,794,764 B2 | 8/2014 | Schuck et al. |
| 8,820,937 B2 | 9/2014 | Osterman et al. |
| 8,833,943 B2 | 9/2014 | Schuck et al. |
| 8,851,680 B2 | 10/2014 | Sharp et al. |
| 8,891,042 B1 | 11/2014 | Osterman et al. |
| 8,908,081 B2 | 12/2014 | Davis et al. |
| 8,941,801 B2 | 1/2015 | Robinson et al. |
| 9,046,755 B2 | 6/2015 | Sharp et al. |
| 9,057,880 B2 | 6/2015 | Curtis et al. |
| 9,086,578 B2 | 7/2015 | Curtis et al. |
| 9,110,363 B2 | 8/2015 | Petersen et al. |
| 9,121,999 B2 | 9/2015 | Yan et al. |
| 9,146,454 B2 | 9/2015 | Coleman et al. |
| 9,167,236 B2 | 10/2015 | Sharp et al. |
| 9,223,142 B2 | 12/2015 | Schuck, III et al. |
| 9,229,139 B2 | 1/2016 | Osterman et al. |
| 9,235,057 B2 | 1/2016 | Robinson et al. |
| 9,310,618 B2 | 4/2016 | Curtis et al. |
| 9,316,865 B2 | 4/2016 | Osterman et al. |
| 9,350,980 B2 | 5/2016 | Robinson et al. |
| 9,380,220 B2 | 6/2016 | Davis et al. |
| 9,383,590 B2 | 7/2016 | Sharp et al. |
| 9,457,523 B2 | 10/2016 | Coleman et al. |
| 9,459,463 B2 | 10/2016 | Sharp et al. |
| 9,530,397 B2 | 12/2016 | Sharp et al. |
| 9,554,125 B2 | 1/2017 | Schuck et al. |
| 9,594,298 B2 | 3/2017 | Schuck et al. |
| 9,618,765 B2 | 4/2017 | Sharp et al. |
| 9,625,745 B2 | 4/2017 | Sharp et al. |
| 9,664,945 B2 | 5/2017 | Liu et al. |
| 9,680,132 B1 | 6/2017 | Tsai et al. |
| 9,686,474 B2 | 6/2017 | Davis et al. |
| 9,709,883 B2 | 7/2017 | Sharp et al. |
| 9,740,016 B2 | 8/2017 | Schuck et al. |
| 9,823,561 B2 | 11/2017 | Sharp et al. |
| 9,854,180 B2 | 12/2017 | Davis et al. |
| 9,910,207 B2 | 3/2018 | Robinson et al. |
| 9,933,631 B2 | 4/2018 | Osterman et al. |
| 9,933,636 B2 | 4/2018 | Sharp |
| 9,946,088 B2 | 4/2018 | Robinson et al. |
| 10,012,884 B2 | 7/2018 | Osterman et al. |
| 10,049,627 B2 | 8/2018 | Schuck et al. |
| 10,054,851 B2 | 8/2018 | Sharp et al. |
| 10,082,675 B2 | 9/2018 | Sharp et al. |
| 10,129,484 B2 | 11/2018 | Davis et al. |
| 10,187,588 B2 | 1/2019 | Davis et al. |
| 10,203,511 B2 | 2/2019 | Schuck et al. |
| 10,393,946 B2 | 8/2019 | Robinson et al. |
| 10,394,040 B2 | 8/2019 | Gollier et al. |

(56) References Cited

U.S. PATENT DOCUMENTS

| | | |
|---|---|---|
| 10,401,700 B2 | 9/2019 | Osterman et al. |
| 10,416,461 B2 | 9/2019 | Gollier et al. |
| 10,474,229 B1 | 11/2019 | Gollier et al. |
| 10,495,798 B1 | 12/2019 | Peng et al. |
| 10,502,981 B2 | 12/2019 | Sharp |
| 10,520,772 B1 | 12/2019 | Lu et al. |
| 10,539,829 B1 | 1/2020 | Lu et al. |
| 10,545,348 B1 | 1/2020 | Lu et al. |
| 10,571,719 B1 | 2/2020 | Mccabe et al. |
| 10,598,928 B1 | 3/2020 | Lam et al. |
| 10,598,945 B1 | 3/2020 | Lu et al. |
| 10,600,352 B1 | 3/2020 | Wheelwright et al. |
| 10,609,364 B2 | 3/2020 | Geng et al. |
| 10,614,767 B2 | 4/2020 | Schuck et al. |
| 10,630,908 B2 | 4/2020 | Davis et al. |
| 10,642,048 B2 | 5/2020 | Peng et al. |
| 10,670,861 B2 | 6/2020 | Gollier |
| 10,670,928 B2 | 6/2020 | Shi et al. |
| 10,678,057 B2 | 6/2020 | Lu et al. |
| 10,678,116 B1 | 6/2020 | Lam et al. |
| 10,690,930 B1 | 6/2020 | Lu et al. |
| 10,691,198 B1 | 6/2020 | Gollier et al. |
| 10,705,401 B1 | 7/2020 | Lu et al. |
| 10,712,485 B1 | 7/2020 | Lam et al. |
| 10,739,611 B2 | 8/2020 | Schuck et al. |
| 10,739,651 B2 | 8/2020 | Sharp |
| 10,809,585 B1 | 10/2020 | Lu et al. |
| 10,838,214 B2 | 11/2020 | Chen et al. |
| 10,839,609 B2 | 11/2020 | Sears et al. |
| 10,845,597 B1 | 11/2020 | Gollier et al. |
| 10,866,429 B2 | 12/2020 | Sharp et al. |
| 10,871,653 B1 | 12/2020 | Osterman et al. |
| 10,890,823 B1 | 1/2021 | Jiang et al. |
| 10,895,675 B2 | 1/2021 | Sharp et al. |
| 10,901,205 B1 | 1/2021 | Lu et al. |
| 10,902,820 B2 | 1/2021 | Peng et al. |
| 10,914,953 B1 | 2/2021 | Lam et al. |
| 10,928,698 B2 | 2/2021 | Osterman et al. |
| 10,934,381 B2 | 3/2021 | Lu et al. |
| 10,935,790 B2 | 3/2021 | Lu et al. |
| 10,935,804 B1 | 3/2021 | Lu et al. |
| 11,294,113 B2 * | 4/2022 | Sharp ................... G02B 5/3083 |
| 2005/0219447 A1 | 10/2005 | Slaney et al. |
| 2005/0264734 A1 | 12/2005 | Robinson et al. |
| 2006/0292372 A1 | 12/2006 | Paukshto et al. |
| 2007/0076291 A1 | 4/2007 | Hulsey |
| 2007/0279553 A1 | 12/2007 | Yoda et al. |
| 2008/0284948 A1 | 11/2008 | Koishi et al. |
| 2008/0309854 A1 | 12/2008 | Ge et al. |
| 2009/0096970 A1 | 4/2009 | Sakai et al. |
| 2014/0313498 A1 | 10/2014 | Saenger et al. |
| 2016/0109730 A1 | 4/2016 | Mcdowall et al. |
| 2017/0139234 A1 | 5/2017 | Sharp |
| 2018/0039004 A1 | 2/2018 | Yun et al. |
| 2018/0039052 A1 | 2/2018 | Khan et al. |
| 2018/0210223 A1 | 7/2018 | Sharp et al. |
| 2018/0259692 A1 | 9/2018 | Sharp et al. |
| 2019/0018177 A1 | 1/2019 | Sharp |
| 2019/0235145 A1 | 8/2019 | Sharp et al. |
| 2019/0235300 A1 | 8/2019 | Sharp |
| 2019/0265467 A1 | 8/2019 | Yun et al. |
| 2019/0271853 A1 | 9/2019 | Sharp |
| 2019/0302479 A1 | 10/2019 | Smyth et al. |
| 2019/0377176 A1 | 12/2019 | Sharp |
| 2019/0377182 A1 | 12/2019 | Sharp |
| 2019/0377183 A1 | 12/2019 | Sharp |
| 2019/0377184 A1 | 12/2019 | Sharp et al. |
| 2020/0116912 A1 | 4/2020 | Sharp et al. |
| 2020/0142276 A1 | 5/2020 | Sharp et al. |
| 2020/0241305 A1 | 7/2020 | Ouderkirk et al. |
| 2020/0241312 A1 | 7/2020 | Sharp et al. |
| 2020/0379155 A1 | 12/2020 | Sharp |
| 2020/0409183 A1 | 12/2020 | Saylor et al. |
| 2021/0041711 A1 | 2/2021 | Sharp et al. |
| 2023/0014072 A1 * | 1/2023 | Robinson ............... B60K 35/00 |

FOREIGN PATENT DOCUMENTS

| | | |
|---|---|---|
| JP | 2008152220 A | 7/2008 |
| JP | 2008177581 A | 7/2008 |
| WO | 9637806 A1 | 11/1996 |

OTHER PUBLICATIONS

Office Action dated Nov. 3, 2022 for Chinese Application No. 201880059934.9, filed Jul. 17, 2018, 10 pages.

Office Action dated Feb. 21, 2023 for European Application No. 18835931.9, filed Jul. 17, 2018, 5 pages.

Office Action dated Apr. 4, 2023 for Japanese Patent Application No. 2020-502237, filed on Jul. 17, 2018, 7 pages.

Office Action dated May 9, 2023 for Chinese Application No. 201880059934.9, filed Jul. 17, 2018, 9 pages.

* cited by examiner

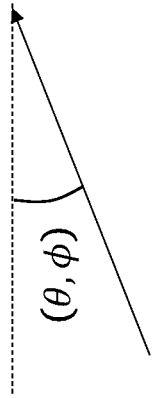

WIDE-ANGLE COMPENSATION OF UNIAXIAL RETARDER STACKS

CROSS-REFERENCE TO RELATED APPLICATIONS

This application claims priority to U.S. Provisional Application No. 62/533,547, filed Jul. 17, 2017, the contents of which are incorporated herein by reference in its entirety.

BACKGROUND

Optical components that convert between orthogonal states-of-polarization (SOP) are in frequent demand. Virtually all polarizers used in products today extinguish or reflect a linear SOP, making a linear-basis the practical reality for most polarization-conversion scenarios. Such conversion is often accomplished using one or more linear retarders. It is also frequently required that conversion be maintained over an extended range of wavelengths and incidence angles. In some situations, it may further be required that there be a separate range of wavelengths over which the input SOP is preserved (unconverted). This additional constraint applies mainly to systems that discriminate between wavelength bands, typically for filtering, separating/combining or switching purposes. Polarization transformations may be required for either transmission or reflection (double-pass) configurations.

The phase-difference introduced by a linear retarder is typically wavelength and angle-of-incidence dependent. The term "A-plate" refers to a linear uniaxial retarder, where the optic-axis (or extraordinary axis) is contained in the plane of the retarder substrate or aperture. "Normally incident" light is taken to be light that is incident normal to the retarder substrate. An A-plate retarder can create two waves from normally incident polarized light and introduce a phase difference between them. A single retarder with an achromatic (i.e. wavelength-insensitive) retardation requires a birefringence that increases with wavelength in a manner that offsets the inverse-wavelength dependence of phase-difference. Attempts to accomplish this achromatic behavior include the use of dispersion-controlled polymer material (e.g. Teijin polymer used for wide-band quarter-wave retarder). Another approach is to use stacks of retarder films that produce a polarization transformation end-point that is common to a range of wavelengths. The latter can be composed of a stack of retarder films of identical material, or two or more materials when beneficial. A retarder stack can be considered a finite-impulse-response (FIR) filter, with linear-systems theory relating the time-domain to the frequency (or wavelength) domain. These principles are described in the prior-art (e.g. Robinson, M. G., Chen, J., & Sharp, G.D. (2005). Polarization Engineering for LCD Projection. Wiley.).

Retarder films are frequently manufactured by stretching a cast or extruded film in the machine direction (MD). MD stretching of conventional display materials, such as polycarbonate (PC) or cyclic-olefin-polymer (COP), produces a positive uniaxial retarder with in-plane retardation of $R_e = (n_x - n_y)d$, where $n_x$ is the refractive index in the MD, $n_y$ is the refractive index in the transverse direction (TD, or cross-web), and d is the film thickness. The increase in average in-plane refractive index creates retardation in the thickness direction, given by $$R_{th} = \left[\left(\frac{n_x + n_y}{2}\right) - n_z\right]d$$

where $n_z$ is the refractive index in the thickness direction. For a typical uniaxial retarder, where $n_y = n_z = n_o$ and $n_x = n_e$, the thickness direction retardation is $R_{th} = R_e/2$.

At normal incidence, this is of no consequence. But when polarization optics must perform the same function regardless of incidence angle, $R_{th}$ is often a problem. And when multi-layer stacks are used (e.g.) to produce an impulse-response that reduces wavelength sensitivity of a polarization transformation, the accumulation of $R_{th}$ can corrupt the normal-incidence condition. This can create a tradeoff between the degree of customization of the $R_e$ impulse-response, limited by the number of layers, and the maintenance of that impulse-response with off-normal rays. Often this customization relates to creating a wavelength-stable polarization transformation over an extended spectral range. The present invention seeks to overcome this tradeoff using practical compensation schemes.

It is against this background that the techniques described herein have been developed.

SUMMARY

Disclosed herein is a compound retarder that includes a first planar retarder that has two dimensions parallel to a plane and a third or thickness dimension orthogonal to the plane, wherein the first retarder has an optic-axis orientation that determines the in-plane retardation and wherein the first retarder has a first retardation in the thickness dimension; a second planar retarder that has two dimensions parallel to a plane and a third or thickness dimension orthogonal to the plane, wherein the second retarder has an optic-axis orientation that is parallel to the optic-axis orientation of the first retarder and wherein the second retarder has a second retardation in the thickness dimension; and a third planar retarder that has two dimensions parallel to a plane and a third or thickness dimension orthogonal to the plane, wherein the third retarder has an optic-axis orientation that is crossed with respect to the optic-axis orientation of the first retarder and wherein the third retarder has a third retardation in the thickness dimension. The first retardation is opposite in sign to the second retardation and the third retardation.

The second retarder and the third retarder may each have a same in-plane retardation. The second retarder and the third retarder may each have an in-plane retardation that is half of the in-plane retardation of the first retarder. The second retarder and the third retarder may each have an in-plane retardation that is between 20% and 80% of the in-plane retardation of the first retarder. A retarder stack may include two or more of the compound retarders described above.

Also disclosed is a compound retarder that includes a first A-plate retarder with a first optic-axis orientation and a first retardation; a second A-plate retarder with a second optic-axis orientation and a second retardation; and a third A-plate retarder with a third optic-axis orientation and a third retardation, wherein the third optic-axis orientation is perpendicular to the second optic-axis orientation. One of the second optic-axis orientation and the third optic-axis orientation is perpendicular to the first optic-axis orientation. The first retardation is opposite in sign to the second retardation and the third retardation.

The second retarder and the third retarder may each have a same in-plane retardation. The second retarder and the third retarder may each have an in-plane retardation that is half of the in-plane retardation of the first retarder. The second retarder and the third retarder may each have an in-plane retardation that is between 20% and 80% of the in-plane retardation of the first retarder. A retarder stack may include two or more of the compound retarders described above.

Also disclosed is a retarder stack for wavelength-dependent manipulation of a state-of-polarization of light passing therethrough. The retarder stack includes a first retarder-stack that includes two linear-retarder layers, wherein the first retarder-stack has a thickness dimension in the direction that light passes therethrough, and wherein the first retarder-stack has a non-zero retardance in the thickness dimension; a second retarder-stack that includes two linear-retarder layers, wherein the second retarder-stack has a thickness dimension in the direction that light passes therethrough, and wherein the second retarder-stack has a non-zero retardance in the thickness dimension; and a pair of crossed A-plate retarders positioned between the first and second retarder-stacks, wherein the pair of crossed A-plate retarders have substantially matched in-plane retardance.

The first and second retarder-stacks may have a birefringence of the same sign and of opposite sign to a birefringence of the crossed A-plate retarders. The retarder stack may have a composite in-plane retardance, and wherein the crossed A-plate retarders reduce the angle-of-incidence dependence of the composite in-plane retardance. The retarder-stacks may be arranged in a reverse-order reflection about 45 degrees configuration, wherein the retarder-stacks act to convert an input state-of-polarization of a predefined range of wavelengths to a state-of-polarization that is orthogonal to the input state-of-polarization, and wherein the pair of crossed A-plate retarders provide azimuth-dependent compensation that reduces the angle-of-incidence dependent change in the composite in-plane retardance. The retarder-stacks may be composed of positive A-plates and the crossed A-plate retarders are composed of negative A-plates. The retarder stacks may not convert the input state-of-polarization over a predefined range of wavelengths, and wherein the crossed A-plate retarders may not contribute adversely to the angle-of-incidence dependent change in the composite in-plane retardance. The azimuth-dependent compensation may be substantially matched in retardation and orientation to the compound retardation that exists between the retarder-stacks, minimizing the composite in-plane retardance. The combination of retarder stacks and crossed A-plates may produce a normal-incidence composite polarization transformation that is substantially insensitive to angle-of-incidence.

BRIEF DESCRIPTION OF THE FIGURES

FIG. 3a shows a functional layer behavior of FIG. 2 in the converted band.

FIG. 3b shows the functional layer behavior of FIG. 2 in the unconverted band.

DETAILED DESCRIPTION

Figure 1:
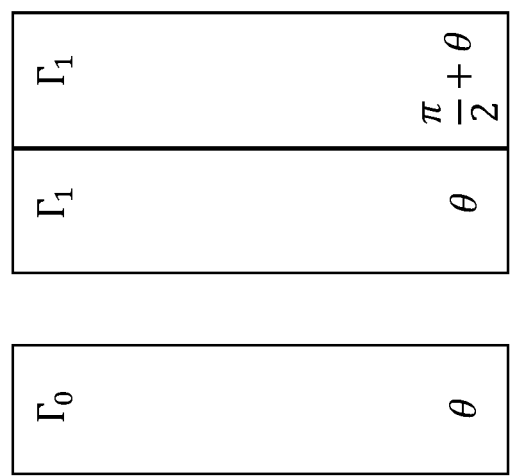
FIG. 1 shows a three-layer linear retarder with orientation θ and $R_e = \Gamma_0$ field-of-view compensated with crossed negative A-plates, each with retardation $\Gamma_1$.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The distinction is often subtle between retarder stack designs that are functionally achromatic (i.e. the wavelength range over which a polarization transformation is uniform), and those that additionally require an achromatic range that preserves the input SOP. Examples of the former include Pancharatnam quarter-wave and half-wave retarders (S. Pancharatnam, "Achromatic combinations of birefringent plates. Part II: an achromatic quarter-WP," Proc. Indian Acad. Sci. 41, 137-144 (1955)), the polarization rotators of Koester (C. J. Koester, "Achromatic combinations of half-wave plates," J. Opt. Soc. Am. 49, 405-409 (1959)), and the pure achromatic rotator designs by Sharp (U.S. Pat. No. 8,408,708). Wavelength selective structures can use dispersion of retardation to create orthogonally polarized spectral regions of prescribed width. Conventional requirements are for achromatic regions that appear isotropic (typically along a compound optic-axis, or eigen-polarization), and regions that are converted to the orthogonal SOP. The width of the transition-band separating these regions (i.e. the spectral width between the converted band and the unconverted band) drives the complexity of the design, as in any finite-impulse-response (FIR) filter. Such structures create a means of (e.g.) manipulating color using polarization splitters/combiners (Sharp, U.S. Pat. No. 5,751,384), or switching between complementary colors. Because they can suffer from similar performance degradation issues in the presence of non-zero $R_{th}$ when used off-normal, the present invention is applicable to both families of structures. Similarly, the compensation schemes can apply to both transmission and reflection-mode (double-pass) structures.

A benchmark for wide-angle performance is a structure consisting only of retarders with $R_{th} = 0$. Single-layer display films with this characteristic include the biaxially stretched polycarbonate developed by Nitto Denko, and by Sumitomo. By stretching in both the MD and the thickness direction, $R_{th} = 0$ is in principle possible. However, there is typically a "sweet-spot" in $R_e$ where this condition can be precisely maintained in manufacturing, with departures from this at other in-plane retardance values. Additionally, z-stretched film is relative expensive to manufacture, and is difficult to purchase today due to the loss of the super-twist nematic display market.

An alternative prior-art solution for creating $R_{th}=0$ is a compound retarder formed by stacking a pair of (crossed) uniaxial films with equal retardation, but opposite sign of birefringence. This can be made by (e.g.) coating a negative birefringent liquid crystal polymer (−A-plate) on a stretched positive birefringent substrate (+A-plate). It can also be formed by lamination of separately manufactured films, co-extrusion and stretching, or other means. When manufacturing wavelength-dependent polarization manipulation structures, this requires a different retardation value for each layer, depending upon (e.g.) the specific center wavelength for conversion/preservation. From a practical standpoint this creates business challenges, given that such structures are often very custom, versus high volume applications such as direct-view display compensators. A solution is thus needed that enables a family of wavelength-selective polarization manipulation structures with improved field-of-view, that only requires changing the retardation of the (more common) positive birefringent film. Again, +A-plates are relatively inexpensive and common, using polycarbonate or olefin substrates.

Another prior-art compound-retarder solution separates the function of in-plane retardation from field-of-view compensation. For example, a single MD stretched film can produce the desired +A-plate $R_e$ value, with a single positive uniaxial retarder with optic axis normal to the substrate (+C-plate) nullifying $R_{th}$. The retardation of the latter is optimally half of the $R_e$ value. +C-plates can be formed by (e.g.) biaxial in-plane (MD/TD) stretching a negative birefringence film, or by homeotropic alignment of a positive-birefringent liquid crystal polymer (LCP) on an isotropic substrate. A C-plate only introduces retardation off-normal in a manner that is azimuth-independent. That is, the C-plate always introduces retardation off-normal, with a projected optic axis that follows the plane-of-incidence (POI). In some instances, additional retardation along the ‰ azimuth is of no consequence, as when it is hidden by the absorption axis of an adjacent polarizer. But this two-layer structure cannot strictly be considered a compound retarder, because there is a distinct optic axis orientation for each element off-normal. In the most general sense, compensation requires azimuth-dependence to truly create a linear retarder with $R_{th}=0$.

Finally, an effective $R_{th}=0$ can be produced using A-plate materials with a single sign of birefringence. This is done via an achromatic polarization transformation between a pair of matched A-plates. In the traditional configuration, an achromatic half-wave retarder with optic axis bisecting crossed+A-plates of equal retardation, reflects the SOP. This polarization reflection has the effect of doubling the $R_e$ value, while nullifying $R_{th}$. The performance of this scheme relies on strict maintenance of the (compound) optic axis orientation and retardation of the HW retarder with respect to wavelength.

Practical compensation schemes are needed that enable uniaxial retarder stacks with an arbitrary degree of customization of the normal-incidence impulse-response, which also preserve normal-incidence behavior for off-normal light. This customization can be accomplished using FIR filter design techniques, or any design methodology that generates a desired impulse-response. The (time-domain) impulse-response is related to the desired wavelength-dependent polarization manipulation via linear-systems theory.

A solution presented here is to produce a true compound retarder that creates independent control of $R_e$ and $R_{th}$. This can be done by forming a three-layer compound retarder, including a pair of matched −A-plates, combined with single +A-plate. The +A-plate is typically an MID-stretched film, with retardation that is specific to the in-plane requirements ($R_e$) of the application. The pair of −A-plates have their optic axes crossed, such that $R_e=0$, with an optic axis aligned parallel to the +A-plate. The retardation of the latter is selected ideally to achieve $R_{th}=0$ for the compound retarder. In order to optimally compensate the $R_{th}$ of the +A-plate, each element has an in-plane retardation of $-R_e/2$. However, a single retardation value for the −A-plate can produce improved field-of-view performance over a broad range of $R_e$ values, making it a very practical means of universal compensation.

While $R_{th}$ is typically associated with a single retarder, retarder stacks with a diverse range of optic-axis orientations can be considered to have a compound (or composite) $R_{th}$ value ($R_{th}^c$). When additional layers of retarder are added, it is to increase the span of the impulse train to synthesize a desired spectrum, such as an achromatic conversion to the orthogonal SOP. In a stack with N+A-plate retarders, the extreme slowest wave sees only the extraordinary index of each retarder, and the fastest wave sees only the ordinary index of each retarder. A stack of uniform thickness retarders each with a retardation of $R_e$ can be considered to have a composite in-plane retardation of $NR_e$ and a composite z-retardation of $NR_{th}$. How the z-retardation impacts performance off-normal is design specific, depending upon the distribution of optic axis orientations relative to the plane-of-incidence (POI). In the case of an achromatic conversion, it can manifest (e.g.) as uniform shift in the normal-incidence spectrum, and/or a failure of the conversion that can manifest as side-lobes or general loss in optical density of a filter. In any case, it can render the stack useless in applications requiring wide acceptance angle.

The three-layer compound retarder has the practical benefit of enabling field-of-view compensation across a broad range of normal-incidence polarization transformations. However, it in general involves a three-layer compound retarder for each layer of a retarder stack design. Tripling the number of retarders increases manufacturing cost and product thickness. Since solvent-welding is frequently used to create retarder-stacks, the need to bond dissimilar materials can make this impractical. A solution is to create retarder stacks that consolidate $R_{th}^c$ in a manner that allows compensation using a small number of layers, ideally according to this invention, using a pair of crossed −A-plate retarders.

General retarder stacks composed of retarders each with $R_{th}=0$ can have exemplary performance with regard to preserving the impulse-response off-normal. A true compound retarder, with stable linear eigen-polarizations and $R_{th}=0$ can be constructed using a +A-plate retarder with an application-specific retardation value+$\Gamma_0$, combined with a pair of matched −A-plate retarders, each with retardation $\Gamma_1$. This configuration is shown in FIG. 1 and has optimum off-normal performance when the compensator retardation has opposite sign of birefringence, and half of the retardation of the application-specific retardation value, or $\Gamma_1=-\Gamma_0/2$. However, the invention recognizes the benefits of a "universal compensator" that can be manufactured easily and applied to a range of retardation values with significant field-of-view benefits. For instance, a compensator that over/under compensates a particular in-plane retardation may deliver (e.g.) a composite $R_{th}^c=\pm 0.2$, which still has a tremendous performance benefit off-normal.

Figure 2:
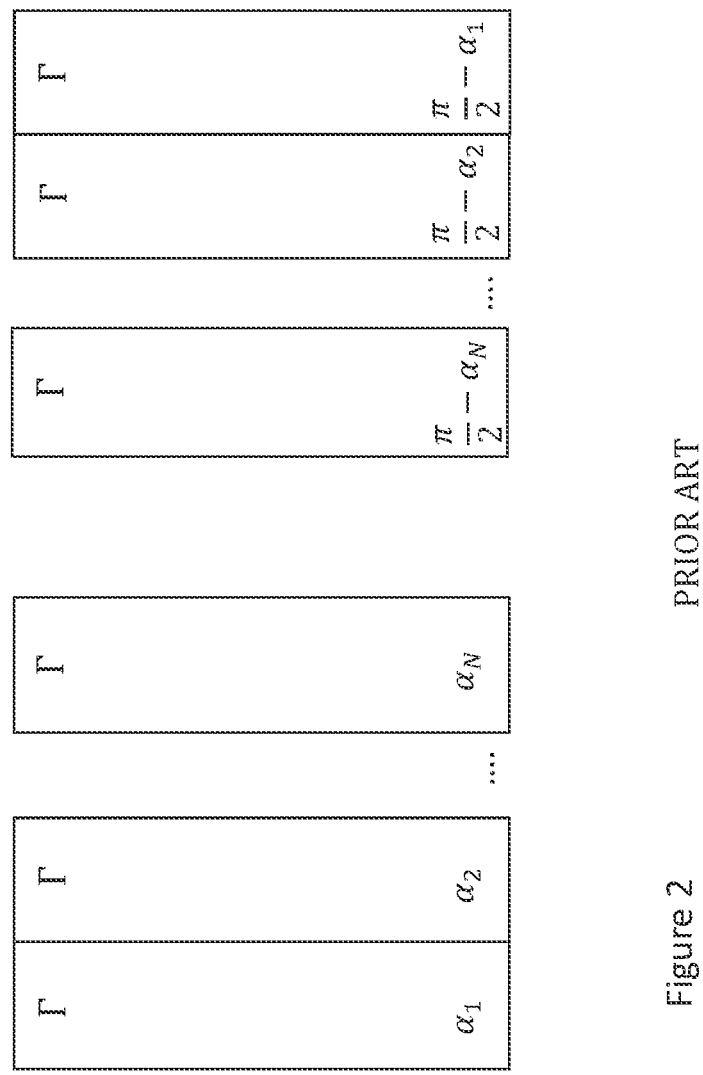
FIG. 2 shows a retarder-stack-pair with reverse-order reflection about 45° symmetry of the prior art.

Pairs of retarder stacks with particular symmetries and their behavior are described in the prior art (see Robinson et al. 2005, Chapter 6). These include reverse-order (relevant to e.g. reflection mode), reverse-order reflection about zero, reverse order reflection about 45°, and reverse order crossed (identity matrix at normal incidence). The latter is omitted from the analysis since it requires a transformation between the stacks to produce a non-trivial transmission function. FIG. 2 shows the general configuration for a retarder-stack pair with a reverse-order reflection about 45° configuration, where each retarder has uniform retardation ¬. The ai represent the optic axis orientation of each of the positive uniaxial retarders. FIG. 3a shows the simplified retarder-stack pair structure of FIG. 2 for the converted band, and FIG. 3b shows that for the unconverted band. These simplifications refer to relevant rotations and compound linear retardations, as described in the Robinson et al. reference at Chapter 6, pp. 143-151.

FIG. 3a shows the behavior of each stack in the stack-pair for the portion of the spectrum converted to the orthogonal SOP, and FIG. 3b shows the behavior of each stack in the stack-pair for the portion of the spectrum that retains the input linear SOP (along) 0/90°. In this case, identical-thickness retarders are assumed. In the converted portion of the spectrum, there are six compound elements, three of which are independent. There is an input linear compound retarder with retardation $\neg_c$ with optic-axis along the input polarization. This is followed by a 45° rotator, followed by a second linear compound retarder with retardation $\neg_c'$ with optic axis again along the input polarization. The symmetry relationship between the two stacks generates the characteristics of the second set of elements, as shown. At normal incidence, the external linear compound retarders are effectively hidden, and the rotators are the only functional elements. The central compound retarders are also effectively hidden, since their optic-axes are crossed (i.e. perpendicular to each other). Off-normal, the central compound retarders function as crossed +A-plates, which can limit the performance.

For off-normal rays, the converted band must continue to see a 90° net rotation, and ideally no compound retardation. The outward facing retarders ($\Gamma_c$) are adjacent to the polarizer/analyzer, so the critical requirement is that the compound optic axis remain wavelength stable along the polarizer extinction axis. Assuming that the rotator functions as-designed off-normal, the structure behaves as if the input polarization is introduced along ±45° with respect to the central compound retarder optic axis, $\Gamma_c'$. Assuming that the compound optic-axis remains wavelength stable off-normal, the central crossed+A-plates show little performance degradation in the ±45° azimuth, with retardation introduced primarily along the 0/90° azimuth off-normal. The present invention recognizes that maintaining performance entails introducing azimuth dependent compensation. This preferably uses crossed negative A-plates along the 0/90° azimuth, with retardation substantially equal and opposite to the compound retardation, $\Gamma_c'$.

An important aspect of achieving good off-normal performance is that the rotator persists in delivering stable performance. Preferable stack designs cluster the optic axes of one stack near 0, which means that the optic axes of the second stack are clustered near 90°. When using uniaxial retarders, which have $R_{th}/R_e = \frac{1}{2}$, this enables consistent rotation, with consolidation of $R_{th}^c$ into the two locations indicated. The relative proportion of $R_{th}^c$ in the form of central crossed+A-plates, verses external retarders is design dependent, making the optimum compensation also design dependent.

Figure 6:
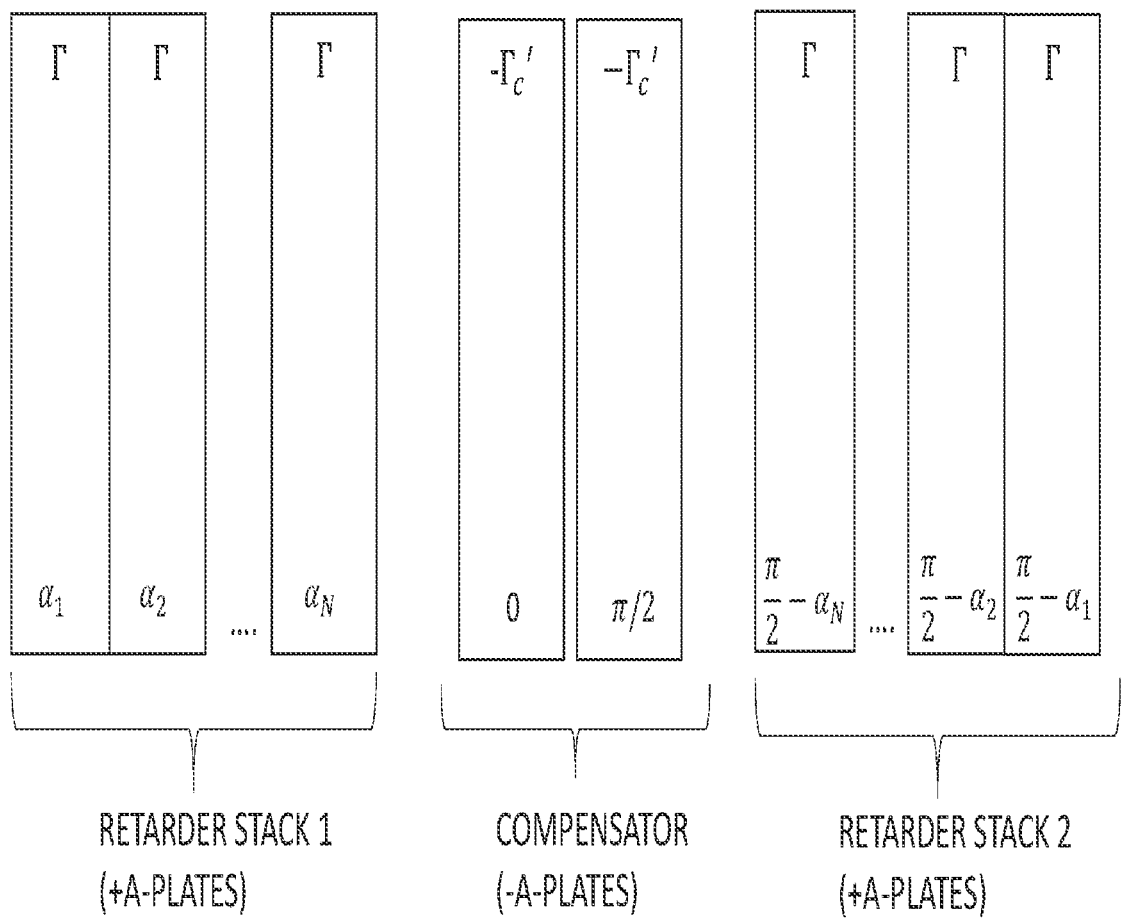
FIG. 6 shows a novel retarder-stack pair with first and second retarder stacks that each include two linear-retarder A-plate layers, with a pair of crossed A-plate retarders positioned between the first and second retarder stacks.

FIG. 6 shows a pair of retarder-stacks with reverse-order-reflection-about −45° symmetry, as shown and described in FIG. 2. In addition, per the invention, a pair of crossed negative A-plates is introduced along the 0/90° azimuth, with retardation substantially equal and opposite to the compound retardation, $\neg_c'$.

There is an intuitive self-compensation aspect to the previous design considerations. If the plane of incidence is along the input polarizer, the spectrum associated with one stack shows substantially pure blue-shift, while that associated with the other stack shows substantially pure red-shift. The opposite occurs when the POI is in the orthogonal direction. When used as a filter, the associated averaging of the behavior of each stack means that the center wavelength of the composite transformation, in particular the 50% point, remains substantially constant with incidence angle. That is, assuming that the $R_{th}$ associated with the central crossed compound retardation is nullified. This can be contrasted with unconstrained retarder stack designs, as described in U.S. Pat. No. 5,751,384. Often the optic axes are distributed over a broad range of azimuth angles, so there is no uniform retardation shift of the structure. At a particular azimuth, one retarder may show maximal red shift, another no shift, and yet another maximal blue shift. In such a scenario, the desired normal incidence impulse function is destroyed as the incidence angle increases.

In summary of the converted band of this example, the "small angle" designs are preferable for delivering a rotation that is stable off-normal, with a compound central retardation with stable optic axis. Because of the clustering of optic axes near 0/90°, there is little performance degradation off-normal in the ±45° azimuth where retardation shift of each film is very small. This is also why compensation of the converted band is very azimuth dependent. When the stacks are paired according to the symmetry, there is a stable 90° rotation, with a significant percentage of (design-dependent) $R_{th}$ in the form of crossed+A-plates with a wavelength stable optic axis. This consolidation of a portion of $R_{th}^c$ at the mid-point, permits the use of a single crossed −A-plate compensator at the mid-point to effectively nullify the presence of $R_{th}^c$. The optimum compensation substantially matches the −A-plate compensator to that of the central compound retarder and primarily corrects the polarization in the 0/90° azimuth.

If the purpose of the structure is to manipulate polarization wavelength-selectively, a range of wavelengths that precisely retains the input SOP may introduce an additional constraint. FIG. 3b shows the behavior of the stack pair in this situation. Again, a compound retardation $\Gamma_u$ present, crossed with the equivalent crossed retardation. For this symmetry, the structure is purely isotropic (zero $R_e$) at normal incidence. In order for the output to remain consistent with incidence angle, the compound optic axis need only remain wavelength stable along the polarizer. The $R_{th}$ value is immaterial because the retardation is introduced along the compound retarder optic axis. Note that the inventive crossed −A-plate compensation has no significant impact on the unconverted band because the optic axes are along the polarizer.

Table 1 shows examples of small-angle retarder stack filter designs according to the criteria described previously, with a range of N values. The birefringence dispersion of polycarbonate (PC) was used to generate specific filter spectra, using a compensator with zero birefringence dispersion. The 50% transition points for the design were consistent across the designs, with transition slopes increasing with additional layers.

TABLE 1

Angles for each layer of the input stack for a specific example of a retarder-stack-filter. This is for a specific duty ratio, with 0.5% pass/stop band ripple. The second stack conforms to the reverse-order reflection about 45° symmetry.

| Design | 1 | 2 | 3 | 4 | 5 | 6 | 7 | 8 | 9 | Comp (nm) |
|---|---|---|---|---|---|---|---|---|---|---|
| 6-layer | −6.8 | 8.4 | −7.0 | | | | | | | 1300 |
| 8-layer | 4.0 | −7.4 | 7.4 | −4.7 | | | | | | 1800 |
| 10-layer | −3.4 | 6.6 | −7.0 | 5.5 | −1.1 | | | | | 2600 |
| 12-layer | −4.6 | 5.8 | −8.4 | 3.9 | −2.3 | −1.4 | | | | 3500 |
| 14-layer | 1.6 | −0.1 | −2.0 | 5.4 | −7.9 | 5.9 | −4.0 | | | 2100 |
| 16-layer | −3.8 | 4.7 | −8.2 | 5.3 | −4.2 | −0.8 | 0.5 | −2.4 | | 4800 |
| 18-layer | 1.9 | −1.8 | 0.7 | 0.2 | −4.9 | 5.1 | −8.0 | 3.7 | −4.2 | 2300 |

Note that the −A-plate compensation values in Table 1 do not increase as a uniform function of the number of layers.

Example 1: Compensated 14-Layer Filter Using Reverse-Order Reflection about 45°

A computer model was used to illustrate the relative proportion of $R_{th}^c$ associated with $\Gamma_c$ and $\Gamma_c'$. The 14-layer green-magenta filter using the design of Table 1 was used, where each layer has a retardation of 1.5-waves at 530 nm. The value of $R_e^c$ for each stack is therefore 5,565 nm at 530 nm. The best performance at 25° incidence angle in the ‰₀° azimuth was achieved using crossed −A-plates, each with a retardation of 2,100 nm. This should be a somewhat close match to $\Gamma_c'$, indicating that $\Gamma_c$ is approximately 3,465 nm. The stacks were then each swapped end-for-end. The rotation (being reciprocal) was substantially preserved, though the central retardation should now be that of $\Gamma_c$. When the optimization was repeated, the compensator value selected was 4,200 nm. Summing the two optimized compensation values indicates that the total $R_e^c$ is approximately 6,300 nm, which is fairly close to the above calculation based on film retardation. Should it be possible to identify designs that consolidate $R_{th}^c$ along the input polarization, no compensation would be required.

Example 2: Compensated 8-Layer Filter Using Reverse-Order Reflection about 45°

Figure 4A:
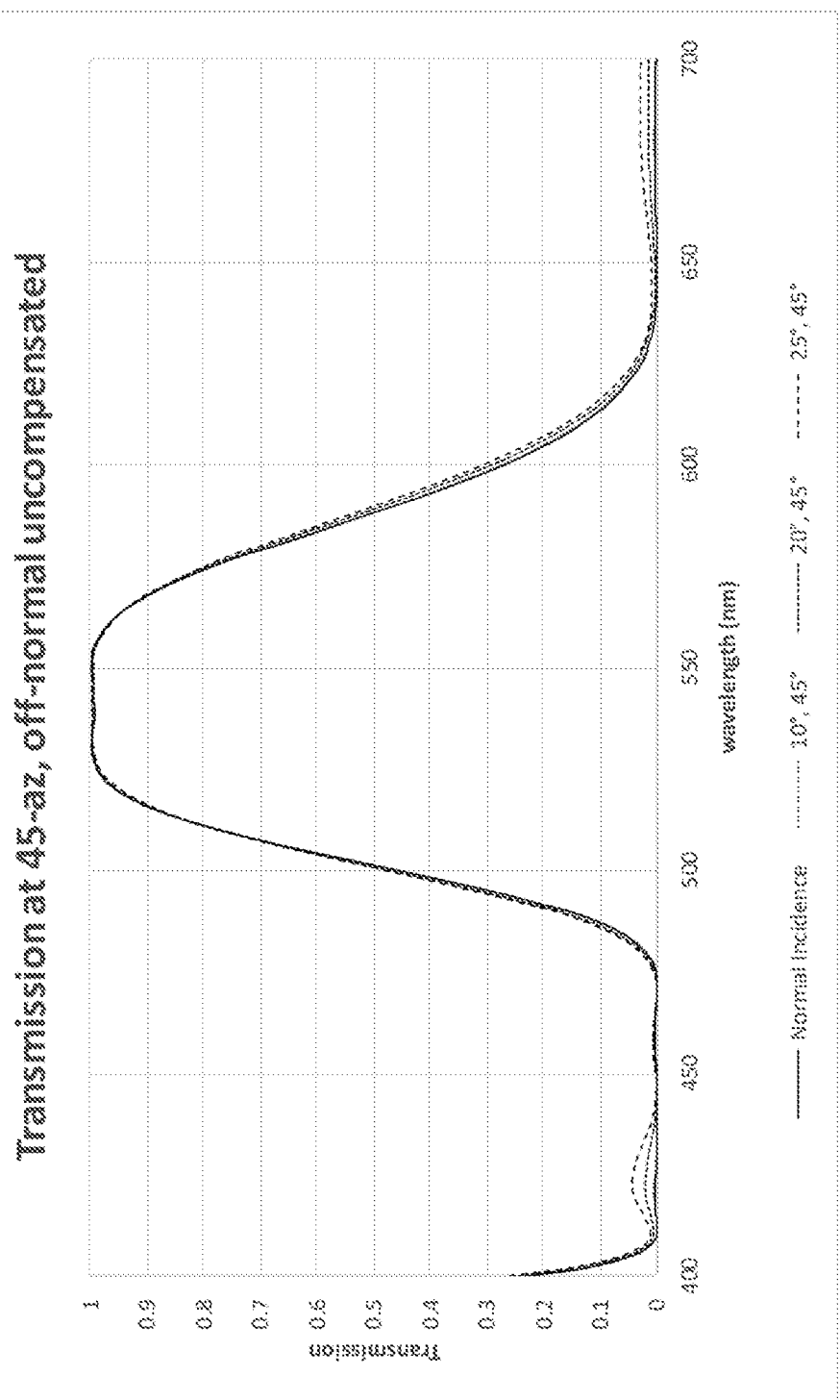
FIG. 4a shows an example of an uncompensated 8-layer green-magenta (GM) retarder stack filter using uniaxial retarders for various incidence angles in the 45° azimuth.
Figure 4B:
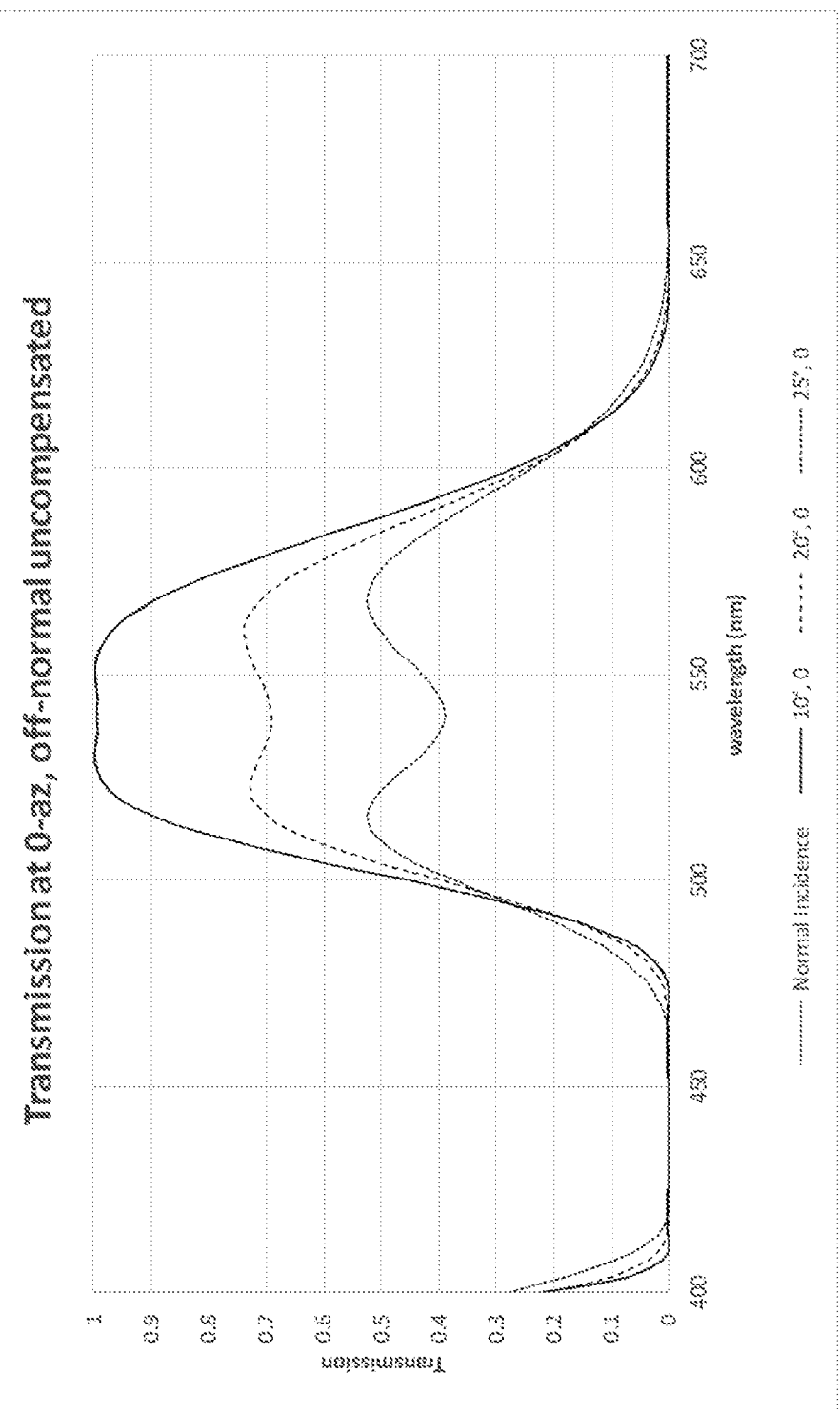
FIG. 4b shows an example of an uncompensated 8-layer green-magenta (GM) retarder stack filter using uniaxial retarders for various incidence angles in the 0° azimuth.
Figure 5A:
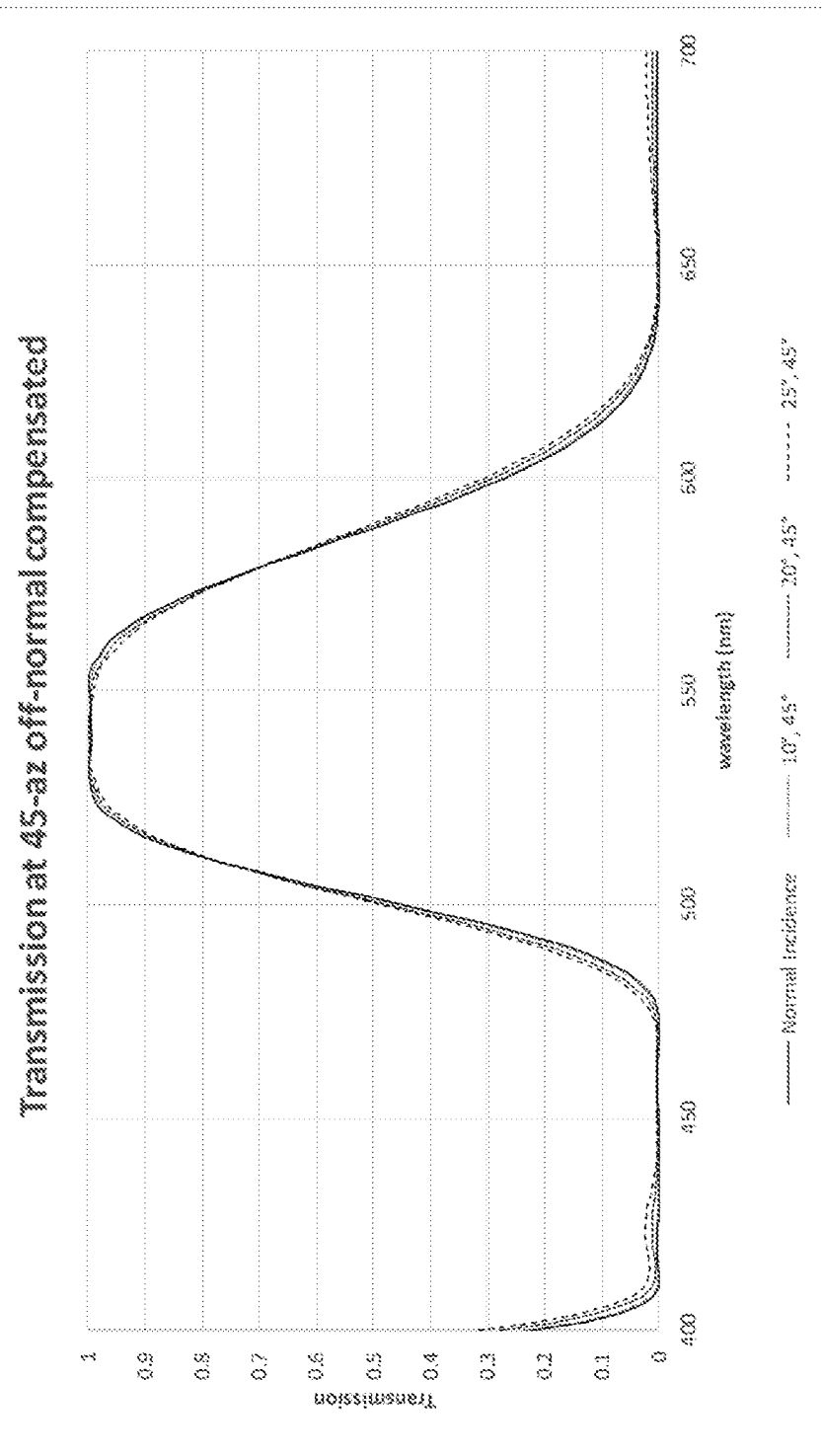
FIG. 5a shows an example of an 8-layer green-magenta (GM) retarder stack filter using uniaxial retarders, compensated according to the invention, for various incidence angles in the 45° azimuth.
Figure 5B:
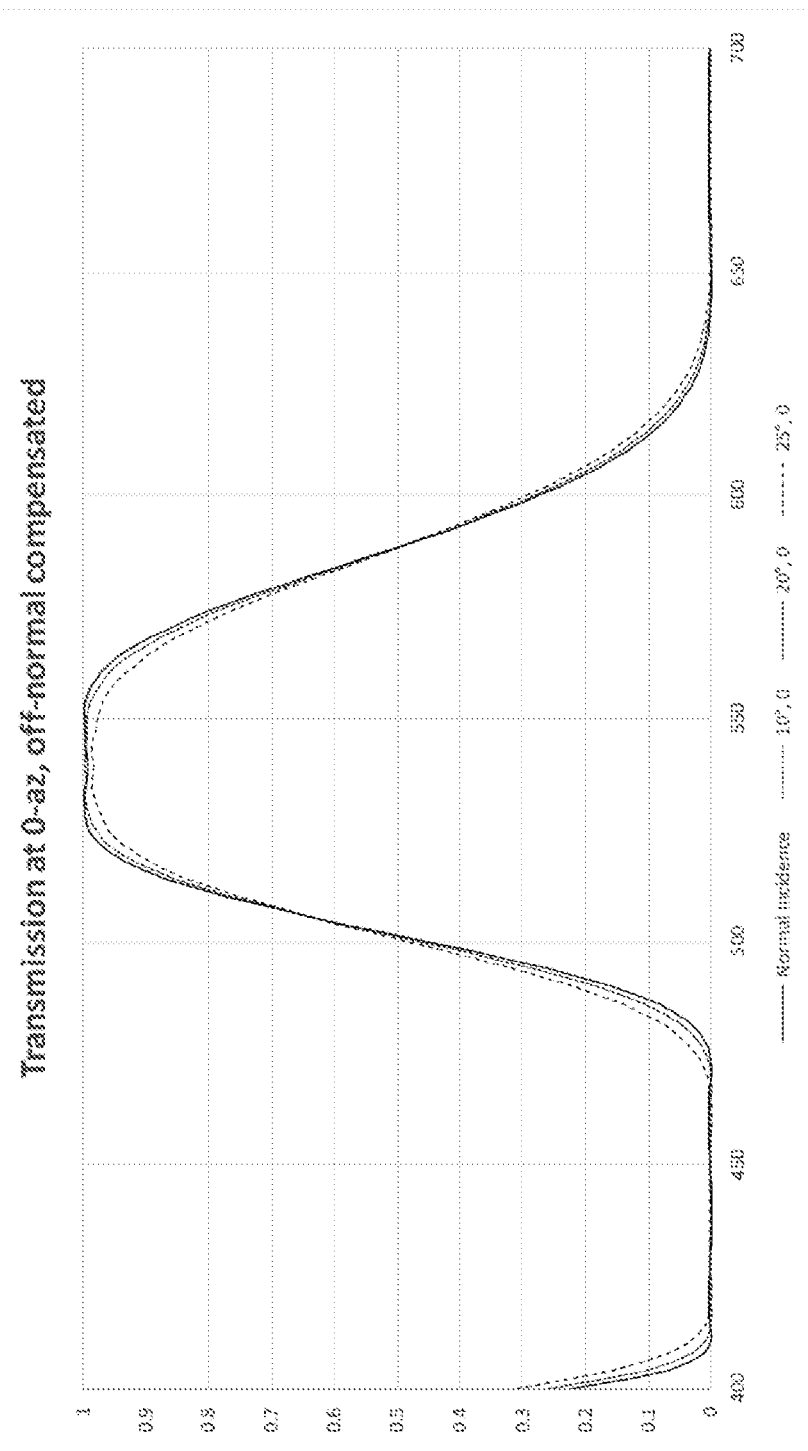
FIG. 5b shows an example of an 8-layer green-magenta (GM) retarder stack filter using uniaxial retarders, compensated according to the invention, for various incidence angles in the 0° azimuth.

FIGS. 4 and 5 shows the design of Table 1 with 8-layers at various incidence angles (0-250) between crossed ideal polarizers. Each layer has a retardation of 1.5-waves at 540 nm, giving a composite retardation of 3,240 nm for each stack. FIG. 4a shows the uncompensated design along the ±45° azimuth, where performance in both the pass-band and stop-band is relatively stable. This is an indication of the stability of the rotation and compound optic-axes off-normal, and the lack of influence by c' in this azimuth. FIG. 4b shows the uncompensated design in the 0/90° azimuth. Note that the compound optic axis remains wavelength stable, so there is insignificant change in the unconverted band, and therefore little leakage in the blue/red portion of the spectrum. While the performance in the green degrades with incidence angle, it is in the form of a loss in peak transmission. There is no significant overall red/blue shift due to the self-compensation of the two stacks under substantially offsetting pure retardation shift. FIG. 5a shows the performance in the ±45° with crossed −A-plate retarders introduced, each with an optimized retardation of 1,900 nm. This can be compared to the spectrum of FIG. 4a which shows that the compensation does not create any loss in performance. FIG. 5b shows the compensated performance in the 0/90° azimuth, which shows that the compensation nearly restores the normal-incidence transmission spectrum. At the extreme incidence angle, there is some smoothing of the profile, but the center wavelength and 50% points are virtually unchanged.

Negative birefringence uniaxial materials are used to create the crossed −A-plate compensators. Suitable materials include inorganic crystals (e.g. sapphire and lithium niobate), liquid crystal polymers (e.g. discotic/lyotropic liquid crystal material coated on an isotropic substrate), or stretched polymer films (e.g. polystyrene). Since the required compensator retardation can be large, materials such as sapphire are particularly attractive. Sapphire has a birefringence of −0.0081, so a 400 micron thick wafer has a retardation of about 3,200 nm. Wafers can be bonded to form crossed −A-plates using adhesives, chemical bonds, or optical contacting.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A compound retarder, comprising:
   a first planar retarder that has two dimensions parallel to a plane and a third or thickness dimension orthogonal to the plane, wherein the first retarder has a single optic-axis orientation that determines the in-plane retardation and wherein the first retarder has a first retardation in the thickness dimension;
   a second planar retarder that has two dimensions parallel to a plane and a third or thickness dimension orthogonal to the plane, wherein the second retarder has a single optic-axis orientation that determines in-plane retardation and that is parallel to the optic-axis orientation of the first retarder and wherein the second retarder has a second retardation in the thickness dimension; and
   a third planar retarder that has two dimensions parallel to a plane and a third or thickness dimension orthogonal to the plane, wherein the third retarder has a single optic-axis orientation that determines in-plane retardation and that is crossed with respect to the optic-axis orientation of the first retarder and wherein the third retarder has a third retardation in the thickness dimension;

wherein the first retardation is opposite in sign to the second retardation and the third retardation.

2. A compound retarder as defined in claim 1, wherein the second retarder and the third retarder each have a same in-plane retardation.

3. A compound retarder as defined in claim 1, wherein the second retarder and the third retarder each have an in-plane retardation that is half of the in-plane retardation of the first retarder.

4. A compound retarder as defined in claim 1, wherein the second retarder and the third retarder each have an in-plane retardation that is between 20% and 80% of the in-plane retardation of the first retarder.

5. A retarder stack that includes two or more of the compound retarders of claim 1.

6. A compound retarder, comprising:
a first retarder with a first single optic-axis orientation that determines a first retardation;
a second retarder with a second single optic-axis orientation that determines a second retardation; and
a third retarder with a third single optic-axis orientation that determines a third retardation, wherein the third optic-axis orientation is perpendicular to the second optic-axis orientation;
wherein one of the second single optic-axis orientation and the third single optic-axis orientation is perpendicular to the first single optic-axis orientation;
wherein the first retardation is opposite in sign to the second retardation and the third retardation.

7. A compound retarder as defined in claim 6, wherein the second retarder and the third retarder each have a same in-plane retardation.

8. A compound retarder as defined in claim 6, wherein the second retarder and the third retarder each have an in-plane retardation that is half of the in-plane retardation of the first retarder.

9. A compound retarder as defined in claim 6, wherein the second retarder and the third retarder each have an in-plane retardation that is between 20% and 80% of the in-plane retardation of the first retarder.

10. A retarder stack that includes two or more of the compound retarders of claim 6.

11. A retarder stack for wavelength-dependent manipulation of a state-of-polarization of light passing therethrough, the retarder stack comprising:
a first retarder-stack that includes two linear-retarder layers, each with a single optical axis that determines in-plane retardation, wherein the first retarder-stack has a thickness dimension in the direction that light passes therethrough, and wherein the first retarder-stack has a non-zero retardance in the thickness dimension;
a second retarder-stack that includes two linear-retarder layers, each with a single optical axis that determines in-plane retardation, wherein the second retarder stack has a thickness dimension in the direction that light passes therethrough, and wherein the second retarder-stack has a non-zero retardance in the thickness dimension; and
a pair of crossed A-plate retarders positioned between the first and second retarder-stacks, wherein the pair of crossed A-plate retarders have substantially matched in-plane retardance.

12. A retarder stack as defined in claim 11, wherein the first and second retarder-stacks each have a birefringence of the same sign to one of the crossed A-plate retarders and of opposite sign to a birefringence of an other of the crossed A-plate retarders.

13. A retarder stack as defined in claim 11, wherein the retarder stack has a composite in-plane retardance, and wherein the crossed A-plate retarders reduce the angle-of-incidence dependence of the composite in-plane retardance.

14. A retarder stack as defined in claim 13, wherein the azimuth-dependent compensation is substantially matched in retardation and orientation to the compound retardation that exists between the retarder-stacks, minimizing the composite in-plane retardance.

15. A retarder stack as defined in claim 11, wherein the retarder-stacks are arranged in a reverse-order reflection about 45 degrees configuration, wherein the retarder-stacks act to convert an input state-of-polarization of a predefined range of wavelengths to a state-of-polarization that is orthogonal to the input state-of-polarization, and wherein the pair of crossed A-plate retarders provide azimuth-dependent compensation that reduces the angle-of-incidence dependent change in the composite in-plane retardance.

16. A retarder stack as defined in claim 15, wherein the retarder-stacks are composed of positive A-plates and the crossed A-plate retarders are composed of negative A-plates.

17. A retarder stack as defined in claim 15, wherein the combination of retarder stacks and crossed A-plates produce a normal-incidence composite polarization transformation that is substantially insensitive to angle-of-incidence.

18. A retarder stack as defined in claim 11, wherein the retarder stacks do not convert the input state-of-polarization over a predefined range of wavelengths, and wherein the crossed A-plate retarders do not contribute adversely to the angle-of-incidence dependent change in the composite in-plane retardance.

* * * * *